June 29, 1948.  G. A. LYON  2,444,053
WHEEL STRUCTURE
Filed Dec. 31, 1943
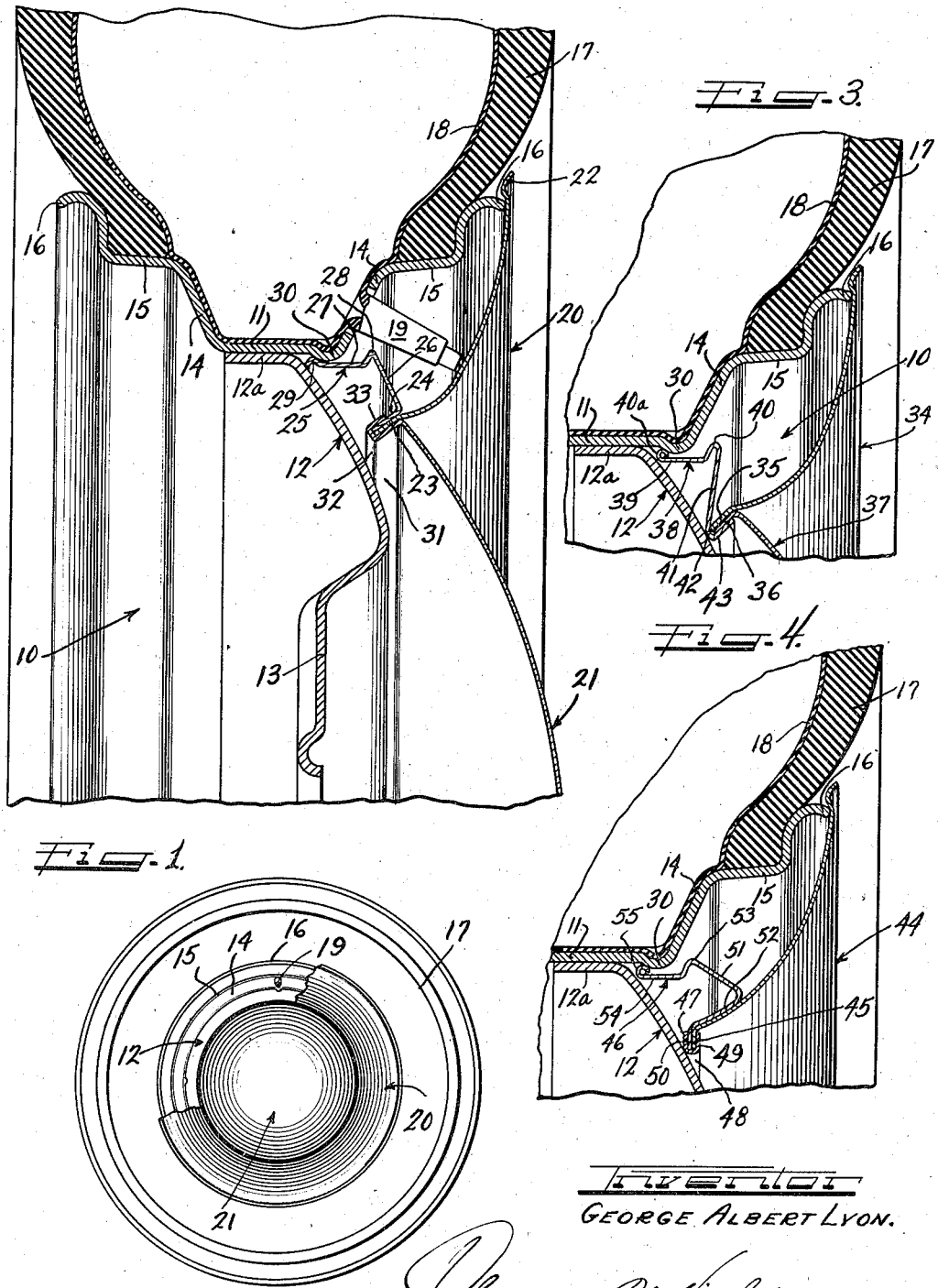
Inventor
GEORGE ALBERT LYON.
by Charles W. Hills Attys.

Patented June 29, 1948

2,444,053

UNITED STATES PATENT OFFICE 2,444,053

WHEEL STRUCTURE

George Albert Lyon, Allenhurst, N. J.

Application December 31, 1943, Serial No. 516,326

13 Claims. (Cl. 301—37)

This invention is directed to an improved wheel structure and relates more particularly to an improved cover assembly therefor.

It is an important object of the present invention to provide improved retaining means for maintaining a wheel cover over the outer side of the wheel structure with which it is associated.

It is still another important object of the present invention to provide retaining means for maintaining a cover over the outer side of a wheel structure, said retaining means also aiding in maintaining the cover parts as a unitary assembly therewith.

It is a further object of the present invention to provide for disposition over the outer side of a wheel structure, a cover assembly including a radially outer part having a radially outer portion formed from synthetic sheet plastic material whereby it is self-sustaining as to form and yet locally, temporarily, resiliently flexible thereby to immediately snap back into initial configuration when distorting pressures are relieved therefrom said cover being arranged over the outer side of the tire rim of a wheel with which it is associated and having a cross-sectional configuration whereby it substantially conforms to the side wall of a tire in the rim, thereby to give the appearance of being a continuation thereof and to appear as a white side wall of the tire when colored white, this cover part being secured to suitable retaining means and, if desired, to a complementary cover portion as a unitary structure with these other parts whereby the entire multi-part cover assembly is, in effect, a unitary structure removable from and attachable to the wheel as a unit.

Still another object of the present invention is to provide a cover assembly disposed over the outer side thereof, a portion of this cover assembly being formed from sheet synthetic plastic material or the like whereby any color or hue imparted thereto extends throughout the depth of the cover and is not, therefore, removed by abrasion or scratching or the like and whereby the cover member and particularly the radially outer portion thereof is locally flexible and extends radially outwardly to the edge portion of a flanged tire rim on the wheel with which it is associated thereby to be axially outwardly flexible relative to the wheel to permit the outward passage of dirt and moisture collecting behind the cover, under the influence of centrifugal forces during operation of the wheel.

In accordance with the general features of the present invention there is provided herein for disposition over the outer side of a wheel structure including a flanged tire rim of the drop center type and a central load bearing portion which is secured thereto, a cover assembly including a radially outer annular part formed from synthetic plastic sheet material whereby it is temporarily, locally, resiliently flexible and also including a central, circular hub cap simulating part which, while it may be formed from the same material as the radially outer cover part, is preferably formed from more rigid material such as sheet stainless steel or the like, there also being provided retaining means having an axially inwardly extending resilient part arranged for detachable engagement with the wheel and an axially outer part formed to conform to the configuration of and lie in surface engagement with a marginal portion of the plastic cover, this relationship between the plastic cover and the retaining means being securely retained by envelopment of the adjacent edge of the complementary cover member therearound.

In accordance with another embodiment of the invention there is provided herein a cover assembly in which the radially inner margin of the annular plastic cover member is disposed in surface engagement with the radially outer margin of the circular cover member, these marginal parts in turn being disposed in nested relationship securely against a flange of the retaining member.

In accordance with still another embodiment of the present invention there is provided herein a construction wherein the adjacent margins of the cover and the retaining means are secured together by an annular, rigidifying, ornamenting edge piece having U-shaped cross-section and enveloping the adjacent marginal portions of the other parts.

Many other objects and advantages of the invention will become apparent from the following description and accompanying drawings in which:

Figure 1 is a side elevational view of a wheel structure embodying one form of my invention with parts broken away for illustrative purposes;

Figure 2 is an enlarged, fragmentary, cross-sectional view of a wheel structure embodying the invention shown in Figure 1;

Figure 3 is an enlarged, fragmentary, cross-sectional view of a wheel structure embodying still another form of my invention; and Figure 4 is an enlarged, fragmentary, cross-sectional view of a wheel structure embodying a further modified form of my invention.

It will be understood that the embodiments shown herein are for illustrative purposes only and may be changed or modified without departing from the spirit and scope of the invention as set forth in the appended claims.

As best shown in Figure 2, the wheel structure shown herein, which is that shown in other embodiments herein, includes a tire rim 10 having a base flange 11 to which may be secured a central load bearing portion or spider 12 by means of an axially inwardly extending peripheral flange 12a thereon. These flanges may be secured together as by welding or riveting or the like. The central load bearing portion 12 is further provided with an inwardly extending bolt-on flange 13 which is formed to receive wheel bolts whereby the wheel may be secured to an appropriate part of the vehicle such as the brake drum or the like.

The tire rim 10 is further provided with opposite side wall flanges 14, opposite intermediate flanges 15 and opposite edge portions 16 between which may be disposed a tire 17 having an inner tube 18 provided with a valve stem 19. The valve stem 19, as will be seen, extends through an aperture in the respective side wall flange 14, thereby to be available for application of the nozzle of an air hose thereto for inflation of the tire in a manner to be presently described.

The cover assembly shown herein, particularly in Figure 2, includes a radially outer cover portion 20 formed of synthetic plastic material whereby it possesses the above mentioned attributes, and a central circular hub cap simulating cover portion 21. Preferably the cover portion 21 is formed from a more rigid material such as sheet stainless steel or the like, whereby it may be either colored or given a high luster, thereby to augment the ornamental appearance of the assembly generally. As will be seen, the cover member 20 is provided at its radially outer edge with an outwardly extending flange 22 which extends beyond the edge portion 16 to conceal the junction between the edge portion of the rim 10 and the tire 17. The cover member 20 also extends radially inwardly to a point beyond the junction of the tire rim and the central load bearing portion and is further provided with a cross-sectional configuration substantially simulating the shape of the side wall of a tire 17, thereby to give the appearance of being a continuation thereof.

The cover member 20 is further provided with a flange 23 at the radially inner margin thereof, this flange 23 being adapted to lie in surface abutment with a radially inwardly, axially inwardly, obliquely disposed finger 24 of a retaining annulus 25. It will be understood that the retaining annulus 25 may if desired, be in the form of a plurality of circumferentially spaced spring clip members.

The annulus 25 is further provided with a radially inwardly, axially outwardly, obliquely disposed resilient portion 26 connected to an axially extending arm 27 by means of a radially outwardly peaked portion 28 which serves as a pry-off anchorage, the arm 27 in turn terminating axially inwardly in a humped or terminal portion 29 which is arranged to resiliently engage behind the inner sides of protuberances 30 deformed out of the material of the tire rim at the axially outer side of the base flange 11 thereof. It will be seen that these protuberances 30 provide also, radially outwardly opening indentations at the inner side of the tire rim for receiving portions of the inner tube 18 when the latter is inflated, whereby to prevent the tube from rotating relative to the wheel.

To the end that the flange 23 of the cover member 20 and the terminal portion 24 of the retaining member may be securely retained in the surface engagement above described. The central circular hub cap simulating cover member is provided at a radially outer part thereof with a flange 31 which is disposed radially inwardly, axially inwardly and obliquely to lie in surface engagement with the flange 23 of the cover member 20. The flange 31 of the cover member 21 merges into an edge enveloping flange 32 which in turn terminates in a flange 33 which, under the influence of a suitable rolling operation is compressed toward the flange 31 with the flanges 23 and 24 therebetween to provide the secure interlocking relationship shown in Figure 2.

When the cover members 20 and 21 and the retaining member 25 are secured together as above described and as shown in Figure 2, it will be understood that they constitute a unitary structure which, as a unit, may be removed from and attached to the wheel structure.

In attaching the cover assembly above described to the wheel structure it will be seen that it is merely necessary for the operator to align the same concentrically with the wheel whereupon axial inward movement of the cover assembly results in resilient engagement of the humped portion 29 of the retaining member 25 behind the shoulders formed by the protuberances 30 on the wheel.

In order to remove the cover assembly from the wheel structure and in order to render the tire valve stem 19 accessible for application of the nozzle of an air hose thereto, it is merely necessary for the operator, by manual manipulation, to flex the adjacent portion of the cover member 20 radially outwardly, whereupon the air hose may be attached to the tire valve stem 19 or if the flexing is for the purpose of removing the cover, the operator need merely insert the point of a pry-off tool behind the circular peak 28 and, with the edge portion 16 of the tire rim 10 as a fulcrum, draw the cover assembly axially outwardly of the wheel structure.

In the construction of Figure 3 the cover assembly includes an annular plastic cover 34 having a radially inner flange 35. This flange is arranged to lie in surface engagement with a flange 36 of the central circular hub cap simulating cover portion 37. It will be understood that in the constructions of either Figure 2 or Figure 3, the central circular hub cap portions 21 and 37 may be replaced by a relatively narrow annular wheel ornamenting bead, the radially outer portion of the bead being formed as shown herein to accomplish the same purposes.

In the construction of Figure 3 the retaining annulus 38 includes an axially inwardly extending resilient portion 39 terminating in a snap-on bead 40a which cooperates with the protuberances 30 as explained in conjunction with Figure 2. This axially inwardly extending portion 39 terminates in a radially outwardly extending peak 40 which in turn merges into a radially inwardly extending flange 41. The flange 41, as will be seen clearly from the drawings, terminates in a curved portion 42 which normally abuts the adjacent portion of the outer surface of the central load bearing portion 12 of the wheel, this curved portion 42 serving as the junction between the flange 41 and a terminal flange 43 which is disposed radially outwardly, axially outwardly and obliquely to conform to flanges 35 and 36 of the cover members 34 and 37 respectively. As will be seen from Figure 3, when the parts are in their ultimate position the cover members are securely and permanently retained upon the retaining member 38 to be associated therewith as a unit which may be attached to and detached from the wheel structure. Preferably the flange 43 is initially in an axially outwardly extending position, whereupon the cover members are disposed against one another and the edges thereof are forced against the radially inner end of the flange 41 of the retaining member 38, whereupon by means of a rolling operation, the flange 43 is deformed to the position shown so that the cover parts may not be drawn axially outwardly thereof.

In applying the cover assembly of Figure 3 to the wheel it will be seen that it is merely necessary for the operator to align the cover assembly concentrically with the wheel and force the same axially inwardly whereupon the bead 40a is deformed from its circular condition by the humps 30 until it has passed the protuberances, whereupon it assumes its round configuration and holds the cover assembly tightly upon the wheel structure.

In order to remove the construction of Figure 3 from the wheel, it is merely necessary for the operator to deflect a portion of the cover member 34 radially outwardly and then insert the point of a pry-off tool behind the peak 40. Thereafter with the edge portion 16 of the tire rim as a fulcrum, the operator merely raises the outer part of the tool thereby drawing the cover assembly away from the respective humps 30.

In the construction of Figure 4, the plastic cover member 44 is similar to those previously described and has the attributes thereof. In this construction the only difference in the cover member is that the radially inner margin thereof extends substantially radially inwardly as shown at 45. Likewise the retaining member 46 is provided with a terminal margin 47 which lies in surface abutment with the flange 45 of the cover 44. The flanges when disposed in this position are secured together by a relatively rigid annulus 48 which is preferably formed from sheet stainless steel, thereby to impart a lustrous or colored border for the cover 44.

From Figure 4 it will be seen that the annulus 48 is provided with a substantially radially outwardly opening U-shaped cross-sectional configuration and that the flanges 45 and 47 are disposed within the opening thereof, whereby, by means of a rolling operation, the arms 49 and 50 of the annulus 48 may be pressed together by a rolling operation to tightly engage the cover and the retaining member together.

In this construction the retaining member 46 differs from that shown in Figure 3 principally in that the arm 51 thereof extends obliquely, radially outwardly and axially outwardly toward an intermediate part of the cover 44. This portion 51 terminates in a portion 52 which is disposed against the inner surface of the adjacent portion of the cover 44 and conforms to the configuration thereof, thereby to provide a substantially rigid backing for this portion of the cover.

The retaining member 46 of Figure 4 is further provided with a radially outwardly extending peak 53 which merges with an axially inwardly extending flange 54 which in turn terminates in a snap-on bead 55. It will be seen that the peak 53 and the bead 55 serve the same purposes as the peak 40 and snap-on bead 40a of Figure 3.

From the foregoing it will be seen that there is provided herein a novel cover assembly which, though formed from a plurality of cover parts, is maintained as a unitary structure, together with suitable retaining means for attaching the cover assembly to the wheel structure.

It will be understood that while protuberances 30 have been shown herein as the retaining means on the wheel structure, any suitable arrangement may be provided on the wheel for receiving the axially inner extremity of the respective retaining members shown.

What I claim is:

1. In a wheel structure including a flanged tire rim and a central load bearing portion, a cover assembly including a radially outer cover portion formed from synthetic plastic sheet material and extending over the flanges of the tire rim to conceal the same, said cover portion having a cross-sectional configuration generally simulating the side wall of a tire in the tire rim to give the appearance of being a part thereof and including a radially inner marginal flanged portion, retaining means for maintaining the cover over the outer side of the wheel structure in detachable relationship thereto including a wheel engaging portion and an axially outer portion formed to provide a flange disposed to conform to the position of the flange at the radially inner portion of the cover, and a circular member having a substantially U-shaped conformation enveloping said flanges to hold them in secure relationship to one another to maintain the cover and the retaining member together as a unit.

2. In a wheel structure including a flanged tire rim and a central load bearing portion, a cover assembly including a radially outer cover portion formed from synthetic plastic sheet material and extending over the flanges of the tire rim to conceal the same, said cover portion having a cross-sectional configuration generally simulating the side wall of a tire in the tire rim to give the appearance of being a part thereof and including a radially inner marginal flanged portion, retaining means for maintaining the cover over the outer side of the wheel structure in detachable relationship thereto including a wheel engaging portion and an axially outer portion formed to provide a flange disposed to conform to the position of the flange at the radially inner portion of the cover, said flanges being held in secure relationship to one another to maintain the cover and the retaining member together as a unit, said cover assembly also including a central circular hub cap simulating cover portion provided at the radially outer margin thereof with a portion having a U-shaped configuration adapted to receive the flange of said first named cover and of said retaining means in enveloped relationship, thereby to secure said cover parts and said retaining means together as a unitary structure.

3. As an article of manufacture for disposition over the outer side of a wheel structure having a flanged tire rim and a central load bearing portion, a cover assembly including a circular cover member having a marginal flange, retaining means for maintaining the cover over the outer side of a wheel with which it is associated, said retaining means including an axially inwardly extending wheel engaging portion and an axially outwardly disposed cover retaining portion, said last named portion including a U-shaped flange arranged to receive the flange of the cover in surface abutment and for maintaining said flange of the cover in secure, retained surface abutment with said retaining means, the junction of said portions being formed into a peak portion accessible from the rear side of said cover member for engagement by a pry off tool.

4. In a wheel structure including a flanged tire rim and a central load bearing portion secured thereto, a cover assembly including a radially outer annular part formed from sheet synthetic plastic material, thereby to be self-sustaining as to form and yet locally, temporarily, resiliently flexible so as to immediately snap back to initial configuration upon release of distorting pressures therefrom, said cover having a generally radially inwardly, axially inwardly, obliquely disposed flange at the radially inner margin thereof, a central circular hub cap simulating member having a crowned central portion and provided at the radially outer margin thereof with a generally axially inwardly, radially inwardly, obliquely disposed flange arranged for complementary, interfitting engagement with the flange on said outer cover member and retaining means for maintaining said cover members together as a unitary structure and for securing the same detachably to the wheel structure, said retaining means including an axially inwardly extending part adapted for detachable engagement with the wheel structure and an axially outer part formed to provide a generally axially outwardly, radially outwardly, obliquely disposed flange behind which the flanges of said cover members may be disposed, thereby to retain the cover members and the retaining means together as a unitary structure.

5. In a wheel structure including a flanged tire rim and a central load bearing portion secured thereto, a circular cover assembly including a radially outer annular part formed from sheet synthetic plastic material, said cover being provided with a generally radially inwardly extending peripheral flange at the radially inner margin thereof, retaining means for maintaining the cover over the outer side of the wheel structure including an axially inwardly extending portion arranged for detachable engagement with the wheel structure and an axially outer part including a portion arranged to lie in surface engagement with the portion of the cover immediately radially outwardly of the radially extending flange thereon, said retaining means terminating axially outwardly in a generally radially extending flange arranged to be disposed in surface engagement with the flange of the cover, and means for securing said retaining means and said cover together, including an annular, relatively rigid member having U-shaped cross-sectional configuration, said annular member affording a radially outwardly opening groove into which said flanges of the cover and the retaining means may be disposed, the sides of said annular member being adapted to be compressed against the said flanges to hold the same together, said shoulder comprising annular flanges engaging and on opposite sides of an inner margin of said annulus for confining and backing up said margin on both of its sides.

6. In a wheel structure including a flanged tire rim and a central load bearing portion secured thereto, a circular cover assembly including a radially outer annular part formed from sheet synthetic plastic material, said cover being provided with a generally radially inwardly extending peripheral flange at the radially inner margin thereof, retaining means for maintaining the cover over the outer side of the wheel structure including an axially inwardly extending portion arranged for detachable engagement with the wheel structure and an axially outer part arranged to be disposed in surface engagement with the flange of the cover, and means for securing said retaining means and said cover together including an annular, relatively rigid member having U-shaped cross-sectional configuration, said annular member affording a radially outwardly opening groove into which said flanges of the cover and the retaining means may be disposed, the sides of said annular member being adapted to be compressed against said flanges to hold the same together.

7. In a cover structure for a wheel including flanged tire rim and body parts, a cover comprising a radially outer annulus of resiliently yieldable material and formed to substantially conceal outer side flanges of the rim part, a central circular metallic member opposite the body part and means for fastening an inner edge of said annulus to an outer portion of said circular member and including axially rearwardly projecting means for snap on cover retaining engagement with one of said parts, said means including an annular shoulder concealed by said annulus and engageable by a pry off tool insertable behind said annulus upon the flexing of said annulus away from said rim, said shoulder comprising annular flanges engaging and on opposite sides of an inner margin of said annulus for confining and backing up said margin on both of its sides.

8. A wheel structure according to claim 2 where said retaining means has a pry-off formation arranged to be engaged by a pry-off tool after said outer cover portion is flexed outwardly for access to said pry-off formation.

9. In a wheel structure including tire rim and a central road bearing portion, a cover assembly including a radially outer cover portion extending over the outer side of the tire rim to conceal the same and including a radially inner marginal flanged portion, retaining means for retaining the cover over the outer side of the wheel structure in detachable relationship thereto including a wheel-engaging portion and a portion formed to provide a flange disposed to conform to the position of the flange at the radially inner portion of the cover, said assembly also including a central circular hub-cap-simulating cover portion provided at the radially outer margin thereof with a portion having a U-shaped configuration adapted to receive the radially inner flanged portion of said first-named cover and said flange of said retaining means and in enveloped relationship, thereby to secure said cover parts and said retaining means together as a unitary structure.

10. In a wheel structure including a tire rim and a central load bearing portion, a cover assembly including a radially outer cover portion extending over the tire rim to conceal the same and including a radially inner marginal flanged portion, retaining means for maintaining the cover over the outer side of the wheel structure in detachable relationship thereto including a wheel-engaging portion and a portion formed to provide a flange disposed to conform to the position of the flange at the radially inner portion of the cover, said cover assembly also including a circular member providing a portion having a U-shaped configuration adapted to receive the flanges of said first named cover and of said retaining means in enveloped relationship, thereby to secure said cover part and said retaining means together as a unitary structure.

11. As an article of manufacture for disposition over the outer side of a wheel structure having a tire rim and a central load bearing portion, a cover assembly including three circular members, one of said members having a substantially U-shaped configuration in which the remaining two members are received and thereby securing all three members into a unitary structure, said members comprising an outer member for disposition over the tire rim, a retaining member for maintaining the assembly in place on the wheel, and an inner member, said retaining member being concealed behind said outer and inner members.

12. The article of claim 11 further characterized in that the outer member may be made from a sheet containing plastic material which is self-sustaining as to form and yet locally, temporarily resiliently flexible so as to immediately snap back to initial configuration upon release of distorting pressures therefrom and is adapted to be manually deflected away from the tire rim swingably outwardly about the connection with the other members thereby to expose said retaining member, said retaining member being formed with a generally radially projecting pry-off shoulder disposed for engagement by a pry-off tool for disengaging it from the wheel.

13. In a cover structure for a wheel including a tire rim and a body part, a cover comprising a radially outer annulus of resiliently yieldable material and formed to substantially conceal the outer side of the rim, an inner circular metallic member opposite the body part, and a member including axially rearwardly projecting means for snap-on cover retaining engagement with one of the wheel parts, one of said members having means thereon connecting all three members into a unit, said retaining member including a shoulder concealed by said annulus and engageable by a pry-off tool insertable behind said annulus upon the flexing of said annulus away from said rim.

GEORGE ALBERT LYON.

REFERENCES CITED

The following references are of record in the file of this patent:

UNITED STATES PATENTS

| Number | Name | Date |
|---|---|---|
| 1,234,387 | Pugh | July 24, 1917 |
| 2,212,038 | Lyon | Aug. 20, 1940 |
| 2,279,331 | Lyon | Apr. 14, 1942 |
| 2,306,631 | Lyon | Dec. 29, 1942 |
| 2,368,245 | Lyon | Jan. 30, 1945 |